United States Patent [19]

Hauck

[11] Patent Number: 5,331,660
[45] Date of Patent: Jul. 19, 1994

[54] RING LASER GYRO GAS BYPASS WITH AUXILIARY DISCHARGE

[75] Inventor: James P. Hauck, Santa Ana, Calif.

[73] Assignee: Rockwell International Corporation, Seal Beach, Calif.

[21] Appl. No.: 634,328

[22] Filed: Jul. 24, 1984

[51] Int. Cl.$^5$ .............................. H01S 3/083
[52] U.S. Cl. ............................ 372/94; 372/58
[58] Field of Search .................. 372/94, 58, 63, 86

[56] References Cited
U.S. PATENT DOCUMENTS
4,325,033 4/1982 Shutt ........................... 372/94

Primary Examiner—William L. Sikes
Assistant Examiner—Robert E. Wise
Attorney, Agent, or Firm—H. Fredrick Hamann; George A. Montanye; Tom Streeter

[57] ABSTRACT

A ring laser gyro, having: an envelope for an optically resonant cavity having a gain bore section, the envelope containing an active gas medium. The envelope contains electrically gain bore energizable electrode means having at least two electrodes at electrode locations within the envelope for establishing an electrical discharge in an active gas medium between the electrode locations. The electrical discharge excites a pair of light beams along a lasing path between the electrode locations. The light beams counter-propagate in the optically resonant cavity. The envelope is coupled to means for generating an output signal for the gyro by measuring a difference in the frequencies of the light beams. The active gas medium has an axial current driven gas flow and a return gas flow induced by the electrical discharge in the gain bore. The resultant gas flow contributes to bias errors in the output signal. The envelope also comprises a gas bypass cavity adapted to pneumatically couple the electrode locations along the gain bore. The gas bypass cavity also has a length in excess of that of the gain bore, and second electrode means for an auxiliary discharge path within the bypass cavity to provide axial current driven gas flow between the second electrode means respective electrode locations. Adjustment of the auxiliary discharge current provides a means for adjusting the gyro bias to compensate for bias errors induced by the gain bore axial current driven gas flow. The gas bypass cavity reduces the differential pressure between the respective electrode locations.

23 Claims, 6 Drawing Sheets

MEANS FOR GENERATING AN OUTPUT SIGNAL
30

RING LASER GYRO GAS BYPASS WITH AUXILIARY DISCHARGE

BACKGROUND OF THE INVENTION

1. Field of the Invention

The present invention relates to ring laser gyroscopes and more particularly to ring laser gyroscopes which have bias errors resulting from gas flow within the gas medium.

2. Description of Prior Art

In ring laser gyroscopes, a pair of counter-rotating monochromatic light beams are propagated within a sealed cavity about a closed-loop optical path. The two beams travel in opposite directions around the closed-loop optical path. As the gyroscope cavity rotates in inertial space, the two oppositely traveling beams travel unequal path distances. A component of each light beam is extracted at a single point within the cavity, the point being referenced to the ring laser gyro housing where each of the two components are focused on a suitable detector. The two beams reach the detector having a relative frequency difference resulting from the rotational rate of the gyroscope housing in inertial space. The relative frequency difference is detected as an electrical beat signal which is then electronically interpreted to indicate the direction and inertial rate of rotation of the ring laser gyro housing about the gyro's sensitive axis.

Lasing is typically obtained by applying a DC current source having a voltage sufficient to sustain a discharge in the active gas medium in the gain bore. The discharge is supported between spaced-apart electrodes. The discharge, or plasma excitation current produces a gas flow of ionized gas between oppositely polarized electrodes in the optical cavity. It has long been known that this gas flow tends to induce a bias error in the detected signal of a ring laser gyro. By bias error, we mean a frequency difference between the two beams which are not in proportion to the rotation rate such as: a frequency difference in the absence of rotation, or a change in the frequency difference for a specific rotation rate. Ring laser gyros that use direct current excitation are therefore typically provided with a balanced electrode structure wherein two electrodes of one polarity are symmetrically disposed at each end of the gyro's gain bore about a single electrode of the opposite polarity positioned at the center of the gain bore. This structural arrangement produces two equal and symmetrical plasma flows of ionized gas thereby substantially reducing the bias errors in the detected beat signal.

The active gas medium in a ring laser gyro is typically excited by a DC current source producing a voltage drop between the cathode and each of the two respective anodes. The current source delivers relatively balanced currents to each respective anode through respective active gas medium segments. The gas flow produced in response to the current flow, contributes to a return gas flow between electrodes of opposite polarity. The total ring laser gyro bias error in the detected beat signal is related to the magnitude of the pressure difference between electrodes of opposite polarity.

A prior pending U.S. Patent Application titled "Ring Laser Gyro Gas Bypass", Ser. No. 496,166, filed May 19, 1983 and having the same inventor and assignee, is pertinent. It provided a partial solution to bias errors by providing a gas bypass between electrode locations of opposite polarity through apertures in the gain bore in the lasing path. In this prior invention, the gas bypass operates to control the return gas flow by providing an alternate path for the return gas flow. The alternate path also serves to reduce the pressure differential between electrode locations of opposing polarity.

SUMMARY

It is a major objective of this invention to provide a ring laser gyro having reduced bias errors and bias error sensitivity. The bias error is the difference between the signal that the laser gyro should produce at its output based on its rotation rate in inertial space and the signal that it actually produces.

Another object of the invention is to provide a gas bypass between locations adjacent to first electrically energizable electrode locations of opposite polarity through apertures in the gain bore in the lasing path. The gas bypass operates to control the return gas flow and reduce the pressure differential between electrode locations of opposing polarity; thereby, contributing to a reduction in bias errors.

Another object of the invention is to provide a gas bypass with an auxiliary discharge path having a second electrically energizable electrode means for ionizing the gas within the auxiliary discharge path. The gas flow provided by the auxiliary discharge is electrically biased to induce gas flow in the auxiliary discharge path. The gas flow in the auxiliary discharge path is adjusted by adjusting the electrical bias current to the electrodes to partially cancel the gas flow in the gain bore.

These and other objectives of the invention are realized in a ring laser gyro, comprising: an envelope for an optically resonant cavity having a gain bore, the envelope containing an active gas medium. The ring laser gyro also includes a first electrically energizable electrode means having at least two electrodes at electrode locations within the envelope for establishing an electrical discharge in the gain bore and active gas medium between the electrode locations. The electrical discharge thereby excites a pair of light beams along a lasing path between electrode locations, the light beams counter-propogating in the the electrode locations. The electrical discharge ions, the light beams counter-propogating in the optically resonant cavity. The ring laser gyro also includes a means for generating an output signal for the gyro by measuring a difference in the frequencies of the light beams. The active gas medium has an axial current driven gas flow and a return gas flow induced by the electrical discharge. The resultant of the axial current driven gas flow and return flow contributes to bias errors in the output signal.

The invention ring laser gyro gas bypass cavity pneumatically couples the gain bore electrode locations, the gas bypass cavity has a cross-section selected to provide an alternate and controlled path for the return gas flow between the respective electrode locations; whereby, the gas bypass cavity reduces the tendency of the ring laser gyro to exhibit bias errors in its output signal by reducing the return gas flow in the active gas medium by providing a gas bypass or alternate cavity through which differential pressure between respective electrode locations is reduced.

The gas bypass cavity has electrically energizable electrode means having at least two electrodes at electrode locations within the gas bypass cavity for establishing an electrical discharge in said active gas medium between the electrode locations within said gas bypass. The gas bypass electrical discharge provides a gas bypass axial current driven gas flow induced by said gas bypass electrical discharge and a gas bypass return gas flow, the gas bypass axial current driven gas flow and said gas bypass return gas flow being unequal.

A means for adjusting the gas bypass electrical discharge for adjusting said gas bypass gas flow to essentially cancel the gain bore axial current driven gas flow such as an adjustable current source for the gas bypass electrically energizable electrodes is included.

The gas bypass cavity has a pneumatic path length in excess of the pneumatic path length of the lasing path between the electrode locations. The gas bypass pneumatic path length is selected to inhibit ionization of the gas medium within the gas bypass cavity.

DESCRIPTION OF THE PREFERRED EMBODIMENT

Figure 1:
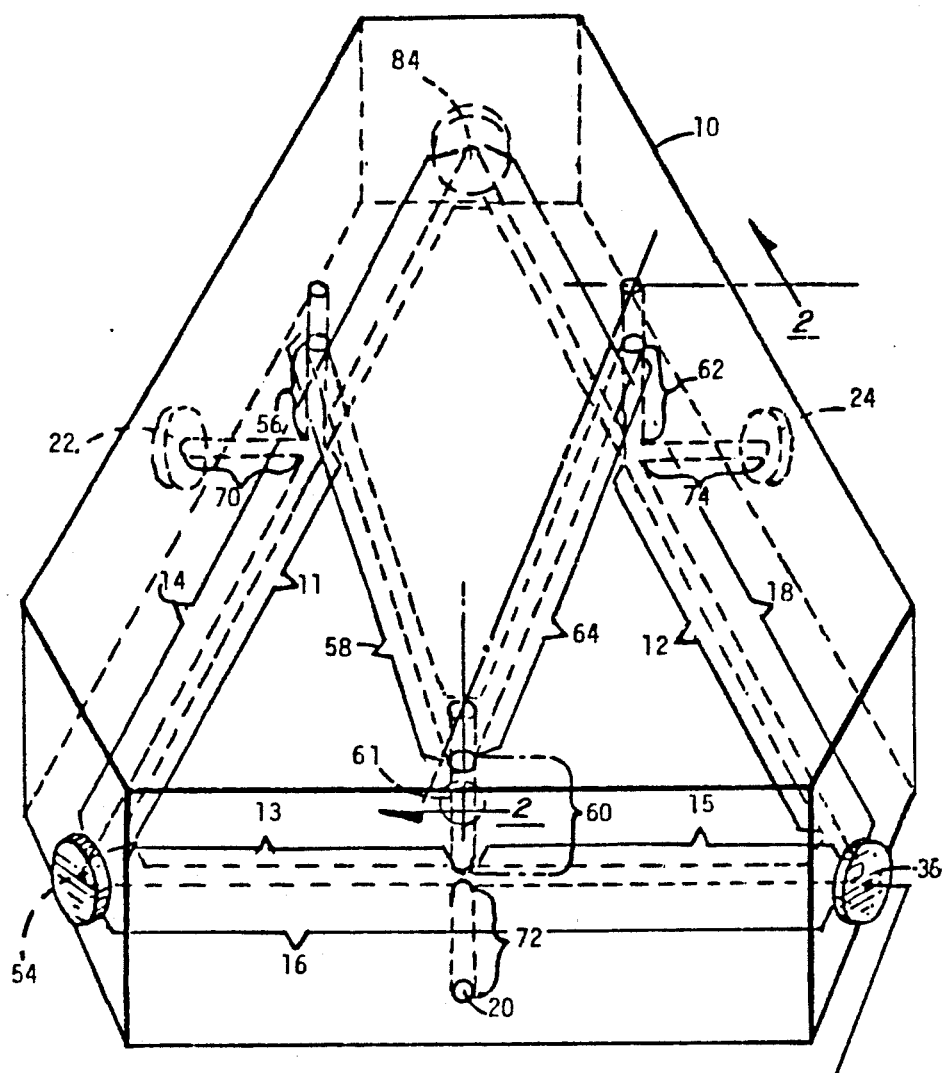
FIG. 1 is a perspective view of the triangular embodiment of the Ring Laser Gyro body showing the gas bypass cavities in phantom.

Referring now to FIG. 1, an embodiment of a ring laser gyro having a triangular body is shown having an envelope 10 for an optically resonant cavity shown in phantom having lasing paths 14, 16 and 18. The gain bore is that portion of the optically resonant cavity having segments 11, 12 and 16. The envelope contains an active gas medium (not shown) confined within the optically resonant cavity. The ring laser gyro typically has electrically energizable electrode means (not shown) having at least two electrodes at electrode locations, such as a cathode at the cathode location at 20, an anode 1 at the anode 1 location 22 and anode 2 at the anode 2 location at 24. The electrodes are typically located within or coupled to the envelope 10 to establish an electrical discharge in the active gas medium in the gain Dore between the gain bore electrode locations 20, 22, 24, thereby exciting a pair of light beams (not shown). The light beams counter-propagate in the optically resonant cavity through the gain bore and along the lasing path 14, 16 and 18. The reflective surfaces of mirrors 54, 84 and 36 are positioned to produce gain within the gain bore and counter rotating light beams around the optical path formed by the reflective surfaces of mirrors 54, 84 and 36.

A means for generating an output signal for the ring laser gyro by measuring a difference in the frequencies of the counter-propagating light beams (not shown) in response to rotation on its sensitive axis is depicted as block 30 coupled optically to partially transmissive mirror 36. Various means for generating an output signal from a ring laser gyro are known in the art such as that described in "Laser Applications" Vol. 1, pg. 139, 1971, by Academic Press. With the gyro body at rest in inertial space, counter-propagating light beams are phased to cancel each other's effect. As the ring laser gyro body 10 is rotated on the gyro's sensitive axis (not shown) but central and normal to the plane and perimeter formed by lasing paths 14, 16, 18, the counter-propagating light beams travel slightly different relative path lengths, in a fixed period of time, due to of the rotational rate of the envelope 10 about the gyro's sensitive axis. The slight difference in relative path lengths traveled by the counter-propagating light beams sensed by the means for generating an output signal, i.e. block 30, produces a signal that relates to the direction of rotation and to the absolute angular rate of the ring laser gyro body on its sensitive axis.

The active gas medium (not shown) contained in the optically resonant cavity has an axial current driven gas flow induced by the electrical discharge and a return gas flow. The axial current driven gas flow (not shown) is referred to as Langmuir flow and the return gas flow, (also not shown) is referred to as Poiseuille flow. The axial current driven gas flow and the return gas flow velocities are unequal which results in a frequency shift or bias in the gyro output.

The triangular body gyro of FIG. 1 has gas bypass cavity comprising segments 56, 58, 60, 64 and 62, is adapted to pneumatically couple the gain bore electrode locations, such as couple the gain bore electrode locations, such as cathode location 20 to the anode 1 location at 22 and to the anode 2 location at 24. The gas bypass cavity typically has a circular cross section; however, other cross-sectional shapes are expected to be of use and to include cross-sectional shapes such as elliptical, square, rectangular or triangular. The cross-sectional shape, size and length is adapted to reduce the return gas flow within the gain bore and between the respective electrode locations such as cathode location 20, anode 1 location at 22 and anode 2 location at 24 by providing an alternate pneumatic path through which part of the return gas flow can be guided and controlled by the size of cross section of the bypass segments of 56, 58, 60 and 64, and 62.

By pneumatically coupling the above referenced locations, the gas bypass cavity also serves to reduce the pressure differential between electrode locations of opposite polarity. The reduced pressure differential is believed to contribute to a reduction in the ring laser gyro bias errors.

The gas bypass cavity pneumatic path length, consisting segments 60 plus 58 plus 56, has a length in excess of the pneumatic and lasing path length along the associated gain bore path segments such as segment 13 and segment 11. The gas bypass cavity pneumatic path length, consisting of segments of 60 plus 64 and 62, has a length in excess of the pneumatic and lasing path length along the associated gain bore path segments such as segments 15 and 12. By providing a gas bypass cavity pneumatic path length in excess of the pneumatic path length of the gain bore between the respective electrode locations, ionization of the gas medium within the gas bypass cavity is inhibited.

Figure 3:
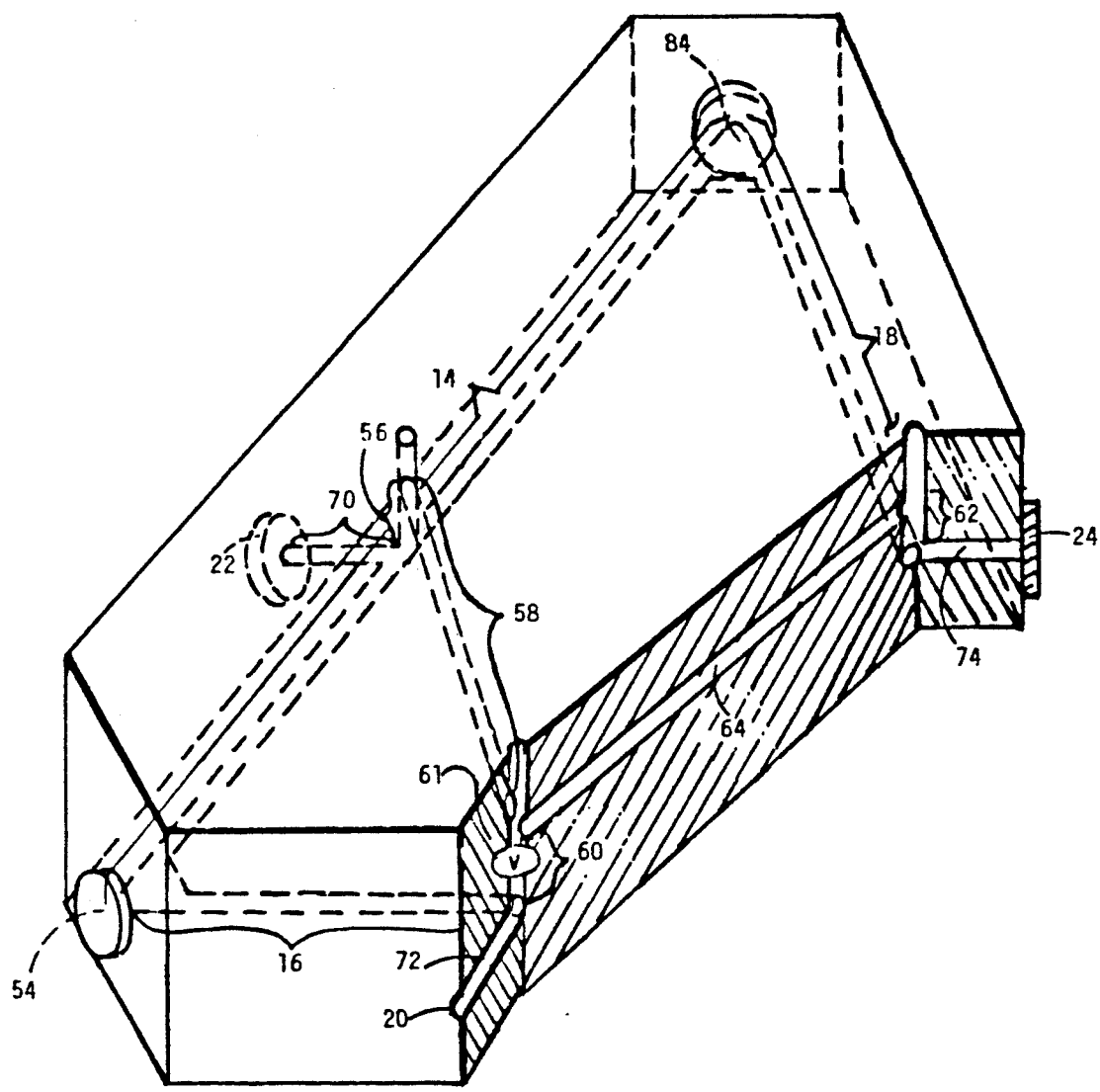
FIG. 3 is a perspective view, partial section and partial elevation showing the Ring Laser Gyro body triangular lasing path and the gas bypass in section and phantom elevated above the triangular lasing path taken along line 2—2 of FIG. 1.

Referring to FIG. 3, the three-sided envelope 10 of FIG. 1 is depicted with a sectional view taken along gas bypass cavity segments 60, 64 and 62. The gas bypass segments 58 and 64 respectively are shown as being straight; however, it is understood that these segments can be configured as other than straight segments to achieve the necessary path lengths to inhibit ionization and to obtain a pneumatic impedance to minimize the gyro bias error. In addition, although gas bypass segments 58 and 64 are shown to be contained within body 10, it is to be understood, that these gas bypass segments can be constructed as hollow segments or tubes, outside of, but in close proximity with body 10, as required to inhibit ionization.

Figure 4:
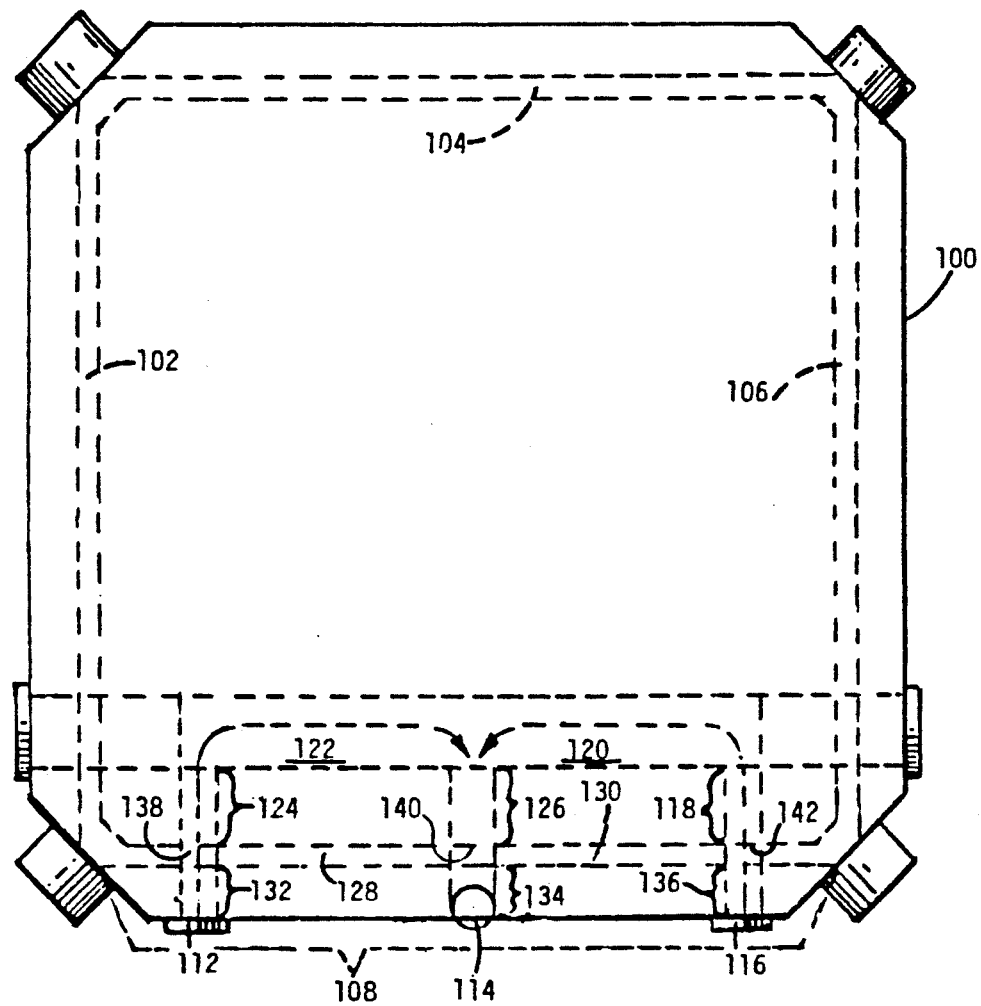
FIG. 4 is a plan elevation view of a rectangular ring laser gyro body showing a square lasing path and a gas bypass cavity having a cross-section larger than that of the lasing path, each being shown in phantom.

FIGS. 4 depicts a square body gyro in which the gas bypass cavity consisting of segments 124, 122, 126, 120, and 118 is coplanar with the plane of the plane of the optically resonant cavity. FIG. 4 shows the respective gas bypass channels coupling anode locations at the ends of their respective straight gain bores, i.e., gain bore segments 128 and 130.

The triangular body gyro embodiment of FIG. 1 has three optical path segments, 14, 16 and 18 coupled together within envelope 10 to form the optically resonant cavity in the shape of a triangle.

Referring again to FIG. 1, the electrically energizable gain bore electrode means comprises a cathode location at 20, a first anode location, such as anode 1 location at 22 and a second anode location, such as anode 2 location at 24. The cathode location at 20, the first anode location at 22 and the second anode location at 24 are each coupled to the active gas medium within the optically resonant cavity 12 via respective bore channels within the envelope, such as respective bore channels 70, 72 and 74. Each respective bore channel is ported into the gain bore through a respective electrode port in the gain bore section of the optically resonant cavity positioned relatively close to the electrode locations such as where bore channel 72 is shown meeting segment 16. The gas bypass cavity is shown to comprise a plurality of cavity segments, such as 60, 56, 58, 60, 64, and 62. The gas bypass cavity segments are coupled to form the gas bypass cavity. The gas bypass cavity is ported to the gain bore section of the optically resonant cavity 14, 16 and 18 at each respective electrode location through a respective gas bypass port in the optically resonant cavity, such as at those near the cathode location at 20, the anode 1 location at 22 and the anode 2 location at 24. Each respective gas bypass port is positioned relatively close but not necessarily adjacent to a respective electrode location.

The envelope 10 optical path segments such as 14, 16 and 18, each have an optical axis (not shown). The optical path segments are coupled in series pairs to link the optical axes at optical junctions, such as mirror surface 54, mirror surface 36 and mirror surface 82 to form a relatively closed optical path circuit within the envelope 10. The mirrored surfaces of mirrors 54, 36 and 84 form a reflective means for directing the pair of counter-propagating light beams at the optical junctions to follow the closed optical circuit around lasing paths 14, 16 and 18. In practice, the mirrors are adjusted to position the counter-propagating light beams relatively close to the optical axis, i.e. the center, of optical path segments.

The electrically energizable gain bore electrode means typically has three electrodes coupled by the gain bore and typically consist of an arrangement, such as a cathode (not shown) at cathode location 20, the anode 1 (not shown) at anode 1 location 22 and the anode 2 (not shown) at anode 2 location 24 and the conventional power supply circuitry, such as precision current sources, (not shown) required to energize the electrode means together operate to establish an electrical discharge in the active gas medium, such as a mixture of helium and neon gas, in the gain bore. The electrodes are positioned to produce relatively balanced axial current driven gas flow in the active gas medium in opposing directions, so as to reduce the net or total differential axial current driven gas flow. The cathode location at 20 is centrally positioned between the anode 1 location at 22 and the anode 2 location at 24 so as to produce balanced axial current driven gas flow in opposite directions. The gas bypass cavity is characterized to pneumatically couple the three gain bore electrode locations and is adjusted in cross sectional size and length to minimize bias errors.

In another alternative embodiment, (not shown) the three gain bore electrodes comprise an anode at a first electrode location and a first and second cathode at a second and third location, the anode being positioned between the first and second cathodes. In this alternative embodiment, the gain bore has a single optical path segment, the first, second and third electrodes each being coupled to the single optical path segment through respective electrode ports in the signal optical path segment, i.e. through a straight, gain bore.

In another alternative embodiment similar to FIG. 1, an anode is substituted for the cathode and first and second cathodes are substituted for anode 1 and 2, and the gain bore is envisioned as having a plurality of optical path segments such as 11, 12 and 16 with the first, second and third electrode locations each being coupled to separate optical path segments through respective electrode ports (not shown). In this alternative embodiment as in those described above, the gas bypass cavity channel segments are envisioned as being positioned to pneumatically link the first and second electrode locations 20, 22 and also the first and third electrode locations 20, 24.

Referring to FIG. 3, the gas bypass having segments 60, 58, 56, 64, and 62 is shown having a means for adjusting the return gas flow to minimize bias errors, such as a valve "V"61. In the preferred embodiment, this valve is adjustable and is mechanically adjusted in the course of calibrating the ring laser gyro to minimize the bias errors. In alternative embodiments, the use of more than one valve is envisioned, making possible the independent adjustment of the return gas flow through gas bypass segments such as 58 and 64. In other alternative embodiments, the use of electrically adjusted valves is envisioned wherein the valves are adjusted in the course of calibrating the ring laser gyro. An electrically adjustable valve makes possible the remote adjustment of the valve for the purpose of compensating for other external parameters, such as temperature.

Figure 2:
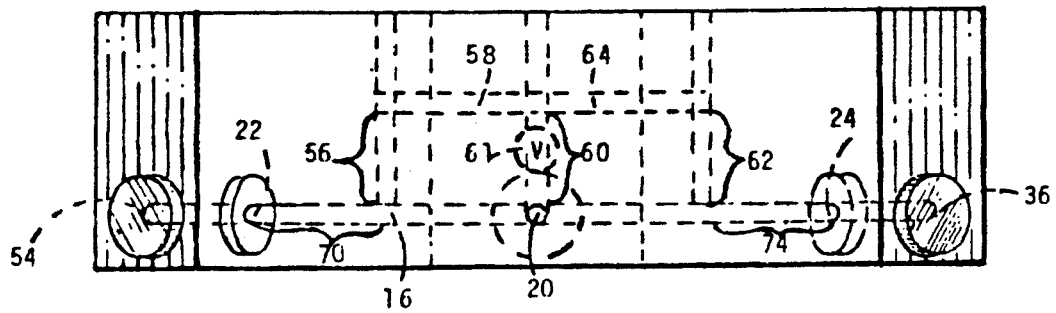
FIG. 2 is a front view of FIG. 1 showing the gas bypass cavities in phantom above the body triangular lasing path.

FIG. 2 illustrates that the optically resonant cavity segments 58 and 64 are out of the plane of the lasing path segments 14, 16 and 18. Anode 1 and anode 2 locations 22, 24 are shown in phantom. Valve V, 61, is shown and is used for adjusting the gas flow to minimize bias errors in the course of gyro calibration. Similar valve means are contemplated for use in other ring laser gyro body configurations.

FIG. 4 depicts a rectangular ring laser gyro body 100 showing a square lasing path having lasing segments 102, 104, 106 and 108. The gas bypass cavity comprises segments 124, 122, 126, 120 and 118 and is adapted to pneumatically couple the electrode locations 112, 114 and 116. The gas bypass cavity has a cross section selected to reduce axial current driven gas flow between the respective electrode locations as in the embodiment of FIG. 1. The gas bypass cavity has two pneumatic path lengths consisting of segments 124, 122, 126, and 120, 118, each of which are in excess of the pneumatic path length of the gain bore paths 128 and 130 to inhibit ionization in the respective gas bypass cavities. The alternative embodiment of FIG. 4 comprises a cathode (not shown) at cathode location 114, a first anode (not shown) at the anode 1 location at 112 and a second anode (not shown) at the anode 2 location 116. The cathode, first anode and second anode are each coupled to the active gas medium within the optically resonant cavity via respective bore channels, i.e. 132, 134 and 136, each respective bore channel being ported into the optically resonant cavity 110 through a respective aperture in the electrode port gain bore section of the optically resonant cavity.

The gas bypass cavity of the alternative embodiment of FIG. 4, further comprises a plurality of gas bypass cavity segments; the gas bypass cavity segments, such as 124, 122, 126, 120 and 118 are coupled to form the gas bypass cavity. The gas bypass cavity is ported to the optically resonant cavity relatively close to each respective electrode location through a respective gas bypass port in the optically resonant cavity at locations 138, 140 and 142, each respective gas bypass port also being positioned relatively close to a respective electrode location; whereby, the gas bypass cavity operates to control the return gas flow and reduce the differential pressure between the electrode locations through the gas bypass ports.

Figure 5:
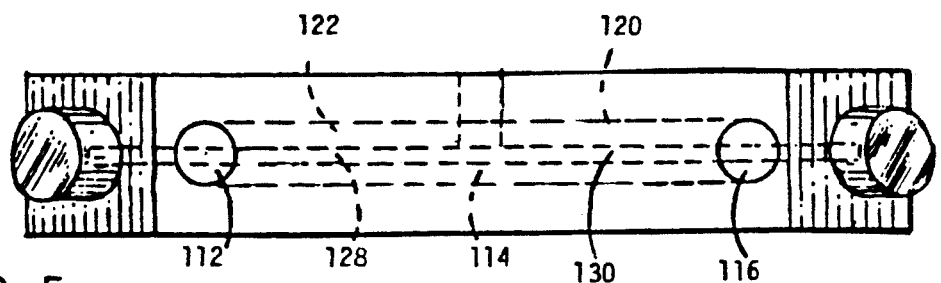
FIG. 5 is a front elevation view of FIG. 4.

FIG. 5 is a front elevation view of the rectangular ring laser gyro body of FIG. 4 showing the gas bypass cavity bore channels at locations 112 and 116 to be circular in cross section and of a larger diameter than that of lasing cavity segments 128 and 130 shown in phantom.

Figure 6:
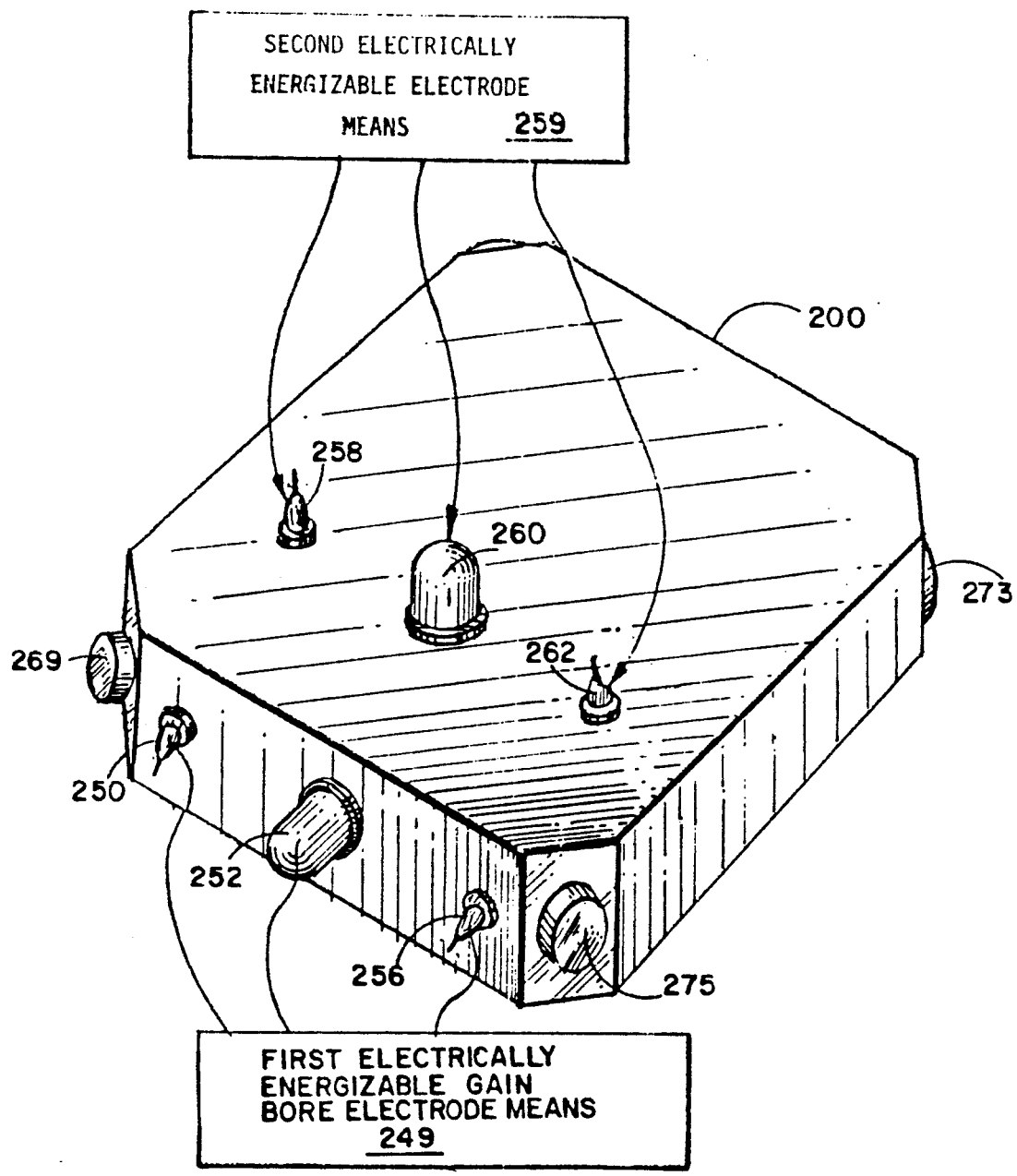
FIG. 6 is a perspective view of an alternative embodiment of a Ring Laser Gyro having a square body and a gas bypass with Auxiliary Discharge showing first and second electrically energizable electrode means depicted on two surfaces of the instrument.

FIG. 6 is a perspective view of a ring laser gyro having a square body and a gas bypass with an auxiliary discharge. An envelope, such as square body 200, is shown having body mounted mirrors 269, 275 and 273. A first electrically energizable gain bore electrode means is shown as functional block 249 having a first anode 250 cathode 252 and second anode 256.

A second electrically energizable electrode means is shown as functional block 259 having first anode 258, cathode 260 and second anode 262 for establishing an electrical discharge in the gas medium between the electrode locations within the gas bypass (not shown).

Figure 7:
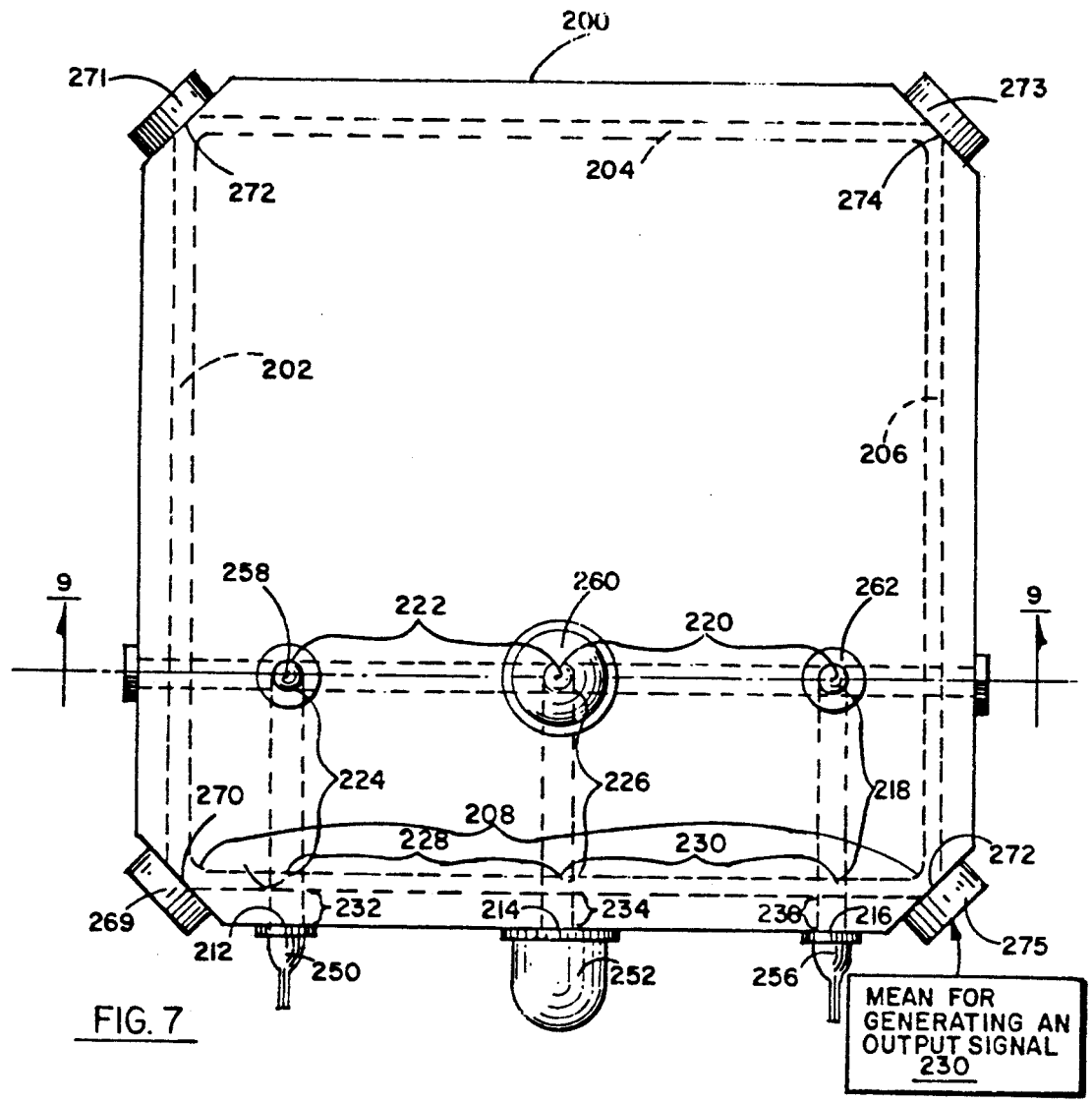
FIG. 7 is a plan elevation view of the rectangular ring laser gyro body of FIG. 6 depicting a lasing path and a gas bypass cavity having an auxiliary discharge path in phantom.

FIG. 7 is a plan elevation view of a preferred embodiment of the ring laser gyro of FIG. 6 having a square optical path and a gas bypass with auxiliary discharge. Envelope 200 has an optically resonant cavity, shown in phantom as segments 202, 204, 206 and 208 having a gain bore having segments 228 and 230. The envelope 200 contains an active gas medium, such as a mixture of Helium and Neon.

The embodiment of FIG. 7 is shown having three electrode locations at first anode 250, cathode 252 and second anode 256 at electrode locations 212, 214 and 216 coupled by the gain bore segments 228 and 230 within the envelope 200 for establishing an electrical discharge in the active gas medium between the electrode locations 212, 214 and 216. The electrical discharge excites a pair of light beams along a lasing path through the gain bore segments 228 and 230 between the electrode locations 212, 214 and 216. The light beams counter-propagate in the optically resonant cavity 202, 204, 206 and 208, wherein the light beams exhibit bias errors. The embodiment of FIG. 2 further includes means for generating an output signal shown schematically as functional block 230 responsive to the counter-propagating light beams (not shown) for measuring a difference in the frequencies of the counter-propagating light beams.

The active gas medium has an axial current driven gas flow induced by the electrical discharge and a return gas flow. The axial current driven gas flow and the return gas flow velocities are unequal and contribute to gyro bias errors.

The embodiment of FIG. 7 further includes a gas bypass cavity shown as segments 224, 222, 226, 220 and 218. The gas bypass cavity is characterized to pneumatically couple the electrode locations 212, 214, 216 and has a cross section and length selected to conduct a part of the return gas flow between the respective electrode locations 212, 214, 216. The cross section and length of the gas bypass is selected to minimize the bias errors.

The gas bypass cavity has a second electrically energizable electrode means, such as gas bypass first anode 258, gas bypass cathode 260 and gas bypass second anode 262. The anodes are positioned to provide relatively symmetrical currents to the cathode 260. The electrodes are typically excited by a precision adjustable current source. The current source for the first electrically energizable electrode means and the current source for the second electrically energizable electrode means, neither of which are shown, are typically powered from a voltage source in the 1 kilovolt range and provide precision bias currents to the respective electrode sets in the 1 milliampere range. The currents provided to the respective electrodes are typically stabilized to within 1 microampere or less. It is understood that variations in the composition of the gas mixture used, the pressure within the cavity and the bias current selected for operation will influence the potential difference between respective electrodes and the gyro bias errors.

The second electrically energizable electrode means has at least two electrodes; however, the preferred embodiment of FIG. 7 shows three electrodes 258, 260 and 262 used and positioned to provide relatively balanced currents and therefore relatively balanced induced axial gas flow within the respective gas bypass segments 222, 220. The gyro bias errors resulting from gas flow imbalance between gain bore first anode 250 to cathode 252 and the current between gain bore second anode 256 and cathode 252 are adjusted by imbalancing the respective currents between the gas bypass first anode 258 to cathode 260 and the gas bypass second anode 262 to cathode 260. Adjusting these currents will only influence the gas flow because the counter propagative light beams do not pass through the gas bypass segments 222, and 260.

The second electrode means also enables adjustment of the gyro made necessary by imperfections in the cavity or by aging. The changes in the gyro bias due to aging can be compensated by further imbalancing or adjusting the current flow between the electrode comprising the second electrode means 258, 260 and 262.

The gas bypass, having segments 224, 222, 226, 220 and 218 has an electrical discharge provided between first anode 258 and cathode 260 and between second anode 262 and cathode 260. The electrical discharge provides gas bypass axial current driven gas flow induced by the gas bypass electrical discharge and a gas bypass return gas flow. The gas bypass axial current driven gas flow and the gas bypass return gas flow are unequal. By adjusting the current from first anode 258 to cathode 260 to be slightly more or less than the current from second anode 262 to cathode 260, an operator can adjust the gas bypass axial current driven gas flow induced by the gas bypass electrical discharge and the gas bypass return gas flow to compensate the gyro for gas flow effects due to the discharge in the gain bore 228, 230. The gas bypass electrical discharge is adjusted to essentially cancel the gas bypass gas flow due to the gain bore axial current driven gas flow. In this manner, the electrical discharge induced gas bypass flow is adjusted to 8 cancel the gas flow induced by the electrical discharge, thereby reducing the ring laser gyro bias errors by reducing the return gas flow in the gain bore 228, 230.

The cathodes 252 and 260, which operate cold, are formed from thin wall aluminum oxidized on the inner surface and sealed to the gyro body using a metallurgical bond. The anodes 250, 256, 258 and 262 are typically formed from copper or brass tubing and are pinched after filling the gyro cavity, to create a metallurgical seal. The anodes and the cathodes typically have flanges to facilitate mounting on the laser gyro body surface using a conventional metallurgical seal by pressing the electrode flange on the gyro body mounting location with an indium interposed between the mounting flange and the gyro body.

Mirrored surfaces 270, 272, 274 and 276 are aligned and adjusted to provide minimum loss. The mirrored surface 276 is typically partially transmissive to allow a small amount of light from each of the counter propagating light beams to exit the resonant cavity 202, 204, 206 and 208 for processing by the means for generating an output signal functional block 230.

The size of the gain bore segments 224, 222, 226, 220 and 218 in relation the optical cavity and gain bore segments 228, 230 are arrived at by empirical test methods. The invention gas bypass cavity with auxiliary discharge contemplates the use of a gas bypass cavity having a diameter slightly larger or slightly smaller than would typically be used for gas bypass cross-sectional dimensions for an application without the provisions for an auxiliary discharge path and more specifically, for auxiliary discharge path and second electrode means providing a controllable gas flow with which to compensate for bias errors. The bias levels for the second electrode means is adjusted to achieve the required flow to compensate for gas flow in the gain bore 228, 230.

The gas bypass cavity having segments 224, 222, 226, 220 and 218 has a pneumatic path length in excess of the pneumatic path length of the gain bore segments 228 and 230 between the electrode locations 212, 234 and 236. The gas bypass pneumatic path length is selected to inhibit ionization of the gas medium between the gas bypass cavity segments such as 222 and 220 and the gain bore segments 228 and 230.

Figure 8:
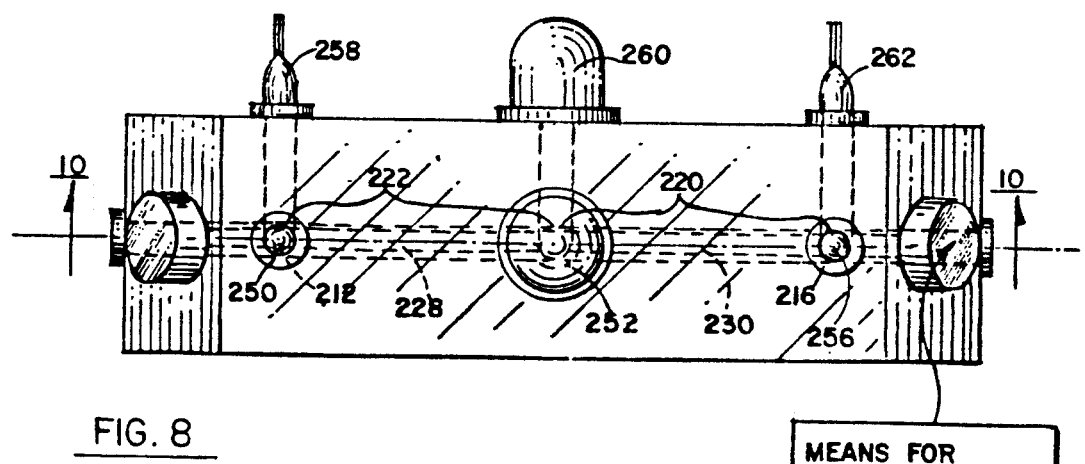
FIG. 8 is a front elevation view of FIG. 7.
Figure 9:
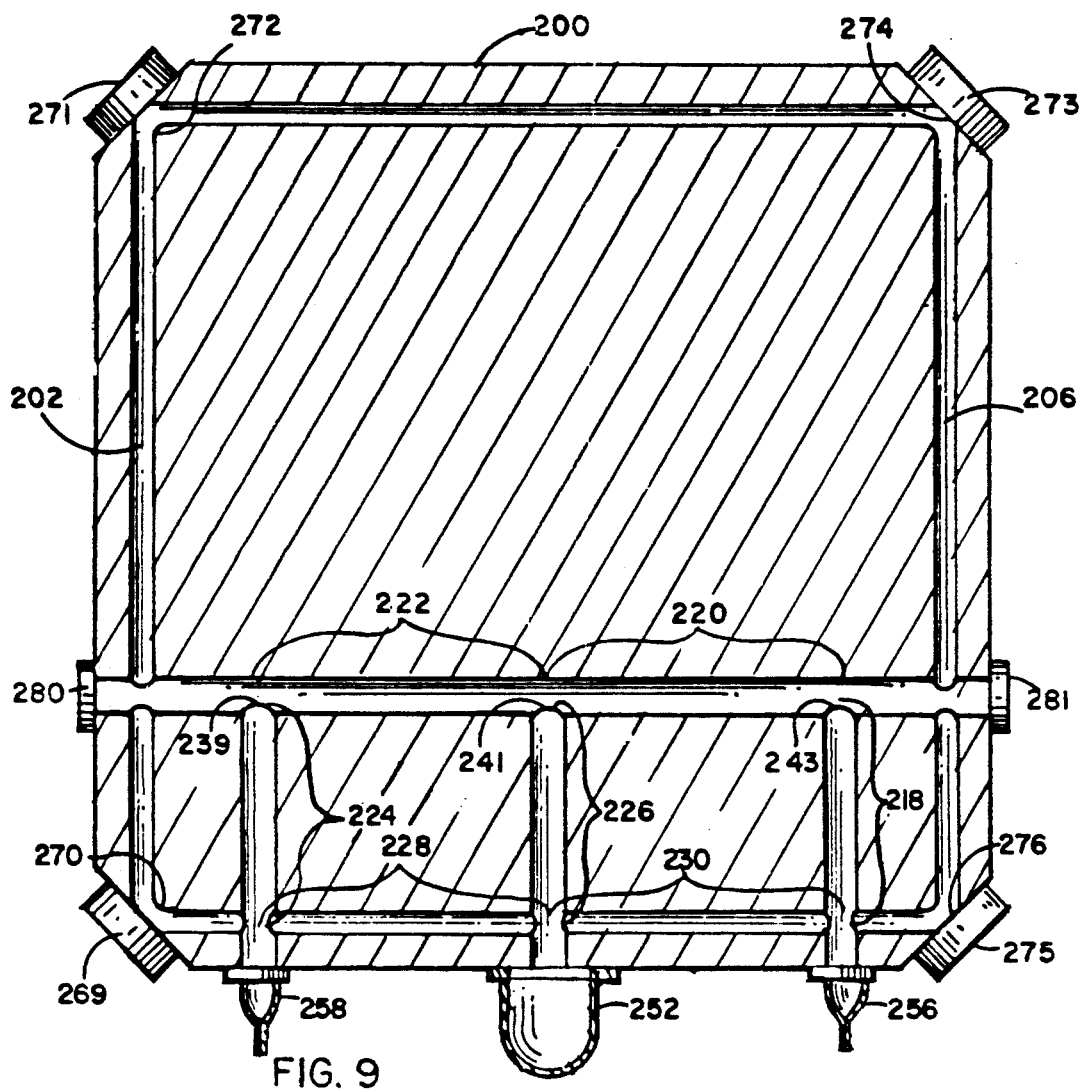
FIG. 9 is a top plan sectional view of FIG. 8 along line 10—10.

FIG. 9 is a sectional view of the square gyro body of FIG. 8 along line 10—10. This figure shows the gas bypass cavity segments 224, 222, 226, 220 and 218, mirrors such as 269 and 275 having mirrored surfaces such as 270 and 276 respectively for guiding the counter propagating light beams. The auxiliary discharge current would be limited to bypass segments 222 and 220.

Figure 10:
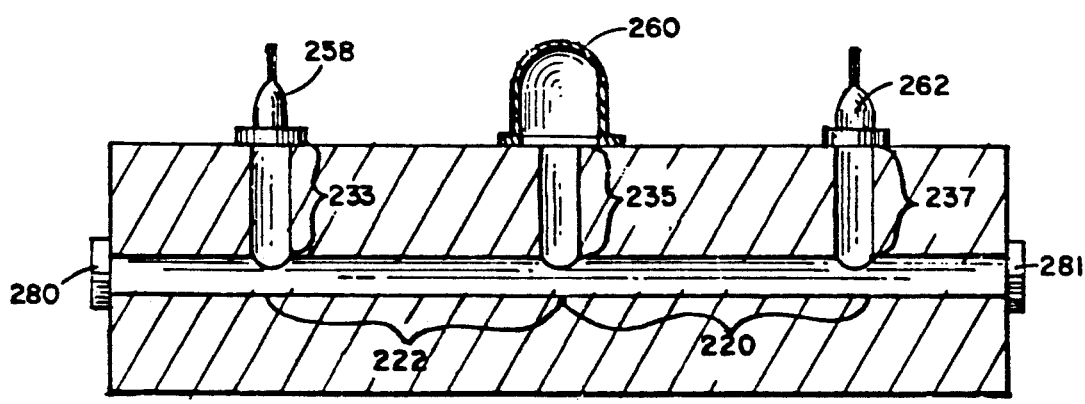
FIG. 10 is a front elevation sectional view of FIG. 1 along line 9—9 showing a sectioned cathode on the top surface.

FIG. 10 is a sectional view of the gyro body 200 of FIG. 7 along line 9—9 showing the bypass cavity segments 222 and 220 in section. The currents from sectioned anodes 258, 262 to sectioned cathode 260 would pass through bore channels 233, 235 and 237. Plugs 280 and 281 are shown to indicate a means for sealing the body drill hole used to form the bypass segments 222 and 220.

Accordingly there has been described a ring laser gyro using a novel gas bypass cavity having a second electrically energizable electrode means having at least two electrodes at electrode locations within said gas bypass cavity for establishing an electrical discharge in said active gas medium between said electrode locations within said gas bypass, said gas bypass electrical discharge providing a gas bypass axial current driven gas flow induced by said gas bypass electrical discharge and a gas bypass return gas flow, said gas bypass axial current driven gas flow and said gas bypass return gas flow being unequal and means for adjusting said gas bypass electrical discharge to adjust the gas bypass gas flow to essentially cancel said gain bore axial current driven gas flow. Although the invention has been disclosed and illustrated in detail it is to be clearly understood that the same is by way of illustration an example only and is not to be taken by way of limitation, the spirit and scope of this invention being limited only by the terms of the appended claims.

What is claimed is:

1. A ring laser gyro, comprising:
   a closed envelope containing an optically resonant cavity having a gain bore therein, said envelope containing a gas medium in said cavity, and
   a first electrically energizable gain bore electrode means having at least two electrodes at gain bore electrode locations in the envelope, said gain bore providing a path between the electrode locations,
   a first current source means coupled to said gain bore electrode means for establishing an electrical discharge to ionize the gas within the gain bore and to form an active gas medium within the gain bore and between said gain bore electrode locations and to excite a pair of counter-propagating light beams along a lasing path through said gain bore, said light beams counter-propagating in said optically resonant cavity,
   means for generating an output signal for said gyro responsive to said counter-propagating light beams for measuring a difference in the frequencies of said counter-propagating light beams;
   said active gas medium in the gain bore having an axial current driven gas flow and a return gas flow induced by the electrical discharge in said gain bore, said gain bore axial current driven gas flow and said return gas flow being unequal; and a gas bypass cavity to pneumatically couple said gain bore electrode locations, said gas bypass cavity conducting a part of said return gas flow between said respective electrode locations, said gas bypass cavity having a second electrically energizable electrode means having at least electrodes at electrode locations within said gas bypass cavity, a second current source means coupled to said second electrode means for establishing an electrical discharge in said gas medium between said electrode locations within said gas bypass, said gas bypass electrical discharge providing a gas bypass axial current driven gas flow and a gas bypass return gas flow, said gas bypass axial current driven gas flow and said gas bypass return gas flow being unequal and means for adjusting said gas bypass electrical discharge to adjust the gas bypass gas flow to essentially cancel said gain bore axial current driven gas flow.

2. The ring laser gyro of claim 1 wherein said gas bypass cavity has a pneumatic path length in excess of the pneumatic path length of said gain bore between said electrode locations;

said gas bypass pneumatic path length, gain bore electrode locations and gas bypass electrode locations being positioned to inhibit ionization of said gas medium within said gas bypass cavity segments between said gain bore electrodes and said bas bypass electrodes.

3. The ring laser gyro of claim 1 wherein said closed envelope further comprises:

three straight optical path segments coupled together in sequence to form said sealed optical resonant cavity in the shape of a triangle;

means for reflecting said counter-propagating light beams at the intersection of each pair of optical path segments.

4. The ring laser gyro of claim 1 wherein said first electrically energizable gain bore electrode means further comprises a cathode;

a first anode; and, a second anode;

said cathode, first anode and second anode each being coupled to said gain bore containing said active gas medium within said optically resonant cavity via respective bore channels within said envelope, each respective bore channel being ported into said gain bore through a respective electrode port in said optically resonant cavity positioned at said respective electrode locations, and means for adjusting the differential currents between the current from said first anode to said cathode and the current from said second anode to said cathode.

5. The ring laser gyro of claim 1, wherein said gas bypass cavity further comprises:

a plurality of gas bypass cavity segments; said gas bypass cavity segments being coupled to form said bypass cavity, said gas bypass cavity being ported to said gain bore at each respective electrode location through a respective gas bypass port in said optically resonant cavity, each respective gas bypass port being positioned relatively close to a respective first electrically energizable gain bore electrode means electrode location;

whereby said gas bypass cavity operates to reduce differential pressure between said electrode locations through said gas bypass apertures.

6. The ring laser gyro of claim 5 wherein said gas bypass further comprises at least one means for adjusting said return gas flow to minimize said bias errors.

7. The ring laser gyro of claim 6 wherein said means for adjusting said return gas flow further comprises at least one adjustable valve.

8. The ring laser gyro of claim 7 wherein each said adjustable valve is mechanically adjusted to minimize said bias errors.

9. The ring laser gyro of claim 7 wherein each said adjustable valve is electrically adjusted to minimize said bias errors.

10. The ring laser gyro of claim 1 wherein said envelope is further comprised of:

a plurality of optical path segments, each optical path segment having:

an optical axis, said optical path segments being optically coupled in series pairs to link said optical axes at optical junctions to form a relatively closed optical circuit within said envelope;

reflective means for directing said pair of counter-propagating light beams at said optical junctions to follow said closed optical circuit;

said first electrically energizable gain bore electrode means having three electrode locations coupled by said gain bore within said envelope for establishing an electrical discharge in said active gas medium, said electrodes being positioned to produce axial current driven gas flow in said active gas medium in opposing directions to balance the resultant gas flows in said opposing directions;

said gas bypass cavity being adapted to pneumatically couple said three electrode locations, said bypass cavity cross section and length being characterized to minimize said bias errors.

11. The ring laser gyro of claim 10 wherein said first electrically energizable gain bore electrode means three electrodes further comprise:

a cathode at a first electrode location, and a first and second anode at a second and third electrode location, said cathode being positioned between said first and second anode.

12. The combination of claim 11 wherein said gain bore has a single optical path segment and wherein said first electrically energizable gain bore electrode means first, second and third electrodes are each coupled to said single optical path segment through respective electrode ports in said gain bore.

13. The combination of claim 11 wherein said gain bore has a plurality of optical path segments and wherein said first, second and third electrodes are each coupled to separate optical path segments through respective electrode ports in said gain bore.

14. The combination of claim 11 wherein said gas bypass cavity comprises:

a plurality of channel segments, said gas bypass cavity channel segments being positioned to pneumatically link said first electrically energizable gain bore electrode means first and second electrode locations and to pneumatically link said first electrically energizable gain bore electrode means first and third electrode locations.

15. The ring laser gyro of claim 14 wherein said gas bypass cavity second electrically energizable electrode means further comprises:
   a cathode;
   a first anode;
   a second anode; and
   means for adjusting the difference current between said second electrically energizable electrode means first anode and said cathode and the current between said second anode and said cathode.

16. The combination of claim 10 wherein said three electrodes further comprise an anode at a first electrode location and a first and second cathode at a second and third location, said anode being positioned between said first and second cathodes.

17. The combination of claim 16 wherein said gain bore has a single optical path segment and wherein said first, second and third electrodes are each coupled to said single optical path segment through respective electrode ports in said gain bore.

18. The combination of claim 16 wherein said gain bore has a plurality of optical path segments and wherein said first, second and third electrodes are each coupled to separate optical path segments through respective electrode ports in said gain bore optical path segments.

19. The ring laser gyro of claim 16 wherein said gas bypass cavity comprises:
   a plurality of channel segments,
      said gas bypass channel segments being positioned to pneumatically link said first electrically energizable gain bore electrode means first and second electrode locations and to pneumatically link said first electrically energizable gain bore electrode means first and third electrode locations.

20. The ring laser gyro of claim 16 wherein said gas bypass cavity second electrically energizable electrode means further comprises:
   an anode;
   a first and second cathode; and
   means for adjusting the difference current between said anode and said first cathode and the current between said anode and said second cathode.

21. The ring laser gyro of claim 1 wherein said envelope has four optical path segments coupled together within said envelope to form said optical resonant cavity in the shape of a rectangle.

22. The ring laser gyro of claim 1 wherein said envelope has five straight optical path segments coupled together within said envelope and mirror means at the intersection of each pair of optical path segments to form said optical resonant cavity in the shape of a pentagon.

23. A ring laser gyro comprising:
   an optically resonant cavity formed from at least three straight segments coupled in a ring configuration and having a mirror at the intersection of each pair of the segments forming the resonant cavity, the optically resonant cavity being sealed and containing a gas lasing medium, one of the mirrors being partially transmissive;
   a gain bore region within at least one segment;
   at least two gain bore electrodes electrically connected to a first source of power, each gain bore electrode being coupled to and spaced apart by said gain bore, said first source of power being adjusted to excite the gas medium in said gain bore to produce counter-propagating light beams in said optically resonant cavity;
   bypass means for minimizing the difference in pressure in the region of each cavity where a gain bore electrode is located, the bypass means comprising at least one gas passageway coupled at each end to a region of the cavity that is proximate the gain bore electrode;
   at least two bypass electrodes electrically coupled to a second source of power; each bypass electrode being coupled to and spaced apart by said bypass means;
   said bypass electrodes exciting the gas in said gas bypass passageway to create a pressure difference within said bypass between said bypass electrodes, said bypass pressure difference being adjusted by controlling said second source of power to essentially cancel any pressure differential resulting from gain bore electrode excitation.

* * * * *